United States Patent
Brookes

(10) Patent No.: US 9,538,461 B1
(45) Date of Patent: Jan. 3, 2017

(54) CIRCUMVENTING WIRELESS DEVICE SPATIAL TRACKING BASED ON WIRELESS DEVICE IDENTIFIERS

(71) Applicant: Microsoft Technology Licensing, LLC, Redmond, WA (US)

(72) Inventor: Paul Anthony Brookes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/788,511

(22) Filed: Jun. 30, 2015

(51) Int. Cl.
*H04W 48/16* (2009.01)
*H04W 4/02* (2009.01)
*H04W 64/00* (2009.01)
*H04W 88/06* (2009.01)
*H04W 84/12* (2009.01)

(52) U.S. Cl.
CPC .............. *H04W 48/16* (2013.01); *H04W 4/02* (2013.01); *H04W 64/003* (2013.01); *H04W 84/12* (2013.01); *H04W 88/06* (2013.01)

(58) Field of Classification Search
CPC ...... H04W 4/02; H04W 48/16; H04W 64/003; H04W 84/12; H04W 88/06
USPC .................... 455/410–411, 434–435.2, 456.1
See application file for complete search history.

(56) References Cited

U.S. PATENT DOCUMENTS

| 7,185,204 | B2 | 2/2007 | Narayanaswami et al. |
| 7,319,681 | B2 | 1/2008 | Park |
| 7,359,989 | B2 | 4/2008 | Orava et al. |
| 7,848,327 | B2 | 12/2010 | Jain et al. |
| 8,009,626 | B2 | 8/2011 | Anjum |
| 8,429,393 | B1 * | 4/2013 | Anderson ............... G06F 21/73 380/273 |
| 8,824,678 | B2 | 9/2014 | Ochikubo et al. |

(Continued)

FOREIGN PATENT DOCUMENTS

WO     2008130127 A1    10/2008

OTHER PUBLICATIONS

"Random MAC Addresses," Retrieved on: May 28, 2015, Available at: https://we.riseup.net/riseuphelp/auto-random-macs.

(Continued)

*Primary Examiner* — Michael Mapa
(74) *Attorney, Agent, or Firm* — Tim Churna; Dan Choi; Micky Minhas

(57) ABSTRACT

A facility for interacting with data networks using a permanent network identifier persistently stored within a computing system is described. In one example facility, in response to each opportunity to connect to a data network, the facility identifies information for the data network, and determines whether the determined identifying matches any of a set of approved data networks. In response to determining that it does, the facility establishes a connection with the first data network using the computing system's permanent network identifier, and conducts the established connection with the first data network using the computing system's permanent network identifier. In response to determining that it does not, the facility establishes a connection with the data network using a temporary network identifier that is different from the computing system's permanent network identifier, and conducts the established connection with the data network using the temporary network identifier.

18 Claims, 3 Drawing Sheets

(56) References Cited

U.S. PATENT DOCUMENTS

| | | | |
|---|---|---|---|
| 2006/0120317 A1 | 6/2006 | Zheng | |
| 2010/0015951 A1 | 1/2010 | Hahn et al. | |
| 2010/0110975 A1 | 5/2010 | Cagenius | |
| 2010/0260142 A1 | 10/2010 | Jung et al. | |
| 2012/0076072 A1* | 3/2012 | Jalfon | H04W 12/02 370/328 |
| 2012/0213211 A1 | 8/2012 | Remaker | |
| 2013/0150035 A1* | 6/2013 | Chande | H04W 60/00 455/435.1 |
| 2014/0185604 A1* | 7/2014 | Kil | H04W 48/20 370/338 |
| 2015/0063205 A1* | 3/2015 | Elliott | H04L 61/6022 370/328 |
| 2015/0103776 A1* | 4/2015 | Luther | H04W 76/021 370/329 |
| 2015/0281167 A1* | 10/2015 | Seddon | H04W 4/021 370/331 |
| 2016/0050559 A1* | 2/2016 | Rose | H04W 12/02 370/338 |

OTHER PUBLICATIONS

Sharma, Prashant, "How to Temporarily Change Android MAC Address Without Rooting," Published on: Jan. 5, 2015, Available at: http://www.techpluto.com/how-to-temporarily-change-android-mac-address-without-rooting/.

Nanni, Dan, "How to spoof the MAC address of a network interface on Linux," Published on: Feb. 18, 2014, Available at: http://xmodulo.com/spoof-mac-address-network-interface-linux.html.

Hoffman, Chris, "How (and Why) to Change Your MAC Address on Windows, Linux, and Mac," Published on: Jun. 30, 2014, Available at: http://www.howtogeek.com/192173/how-and-why-to-change-your-mac-address-on-windows-linux-and-mac/.

"MAC Address Spoofing," Published on: Mar. 28, 2014, Available at: https://tails.boum.org/doc/first_steps/startup_options/mac_spoofing/index.en.html.

"International Search Report ad Written Written Opinion," Issued in PCT Application No. PCT/US2016/039469, Mailed Date: Sep. 5, 2016, 13 pages. (MS# 357501-03).

Gruteser, M. and D. Grunwald, "Enhancing Location Privacy in Wireless LAN Through Disposable Interface Identifiers: A Quantitative Analysis," Mobile Networks and Applications, Kluwer Academic Publishers, BO, vol. 10, No. 3, Jun. 1, 2005, pp. 315-325.

Jiang, T. et al., "Preserving Location Privacy in Wireless LANs," MobiSys '07 Proceedings of the 5th International Conference on Mobidle Systems, Applications and Services, Jun. 11-14, 2007, San Juan, PR, USA, Jan. 1, 2007, pp. 246-257.

* cited by examiner

CIRCUMVENTING WIRELESS DEVICE SPATIAL TRACKING BASED ON WIRELESS DEVICE IDENTIFIERS

BACKGROUND

Mobile devices such as smart phones, tablet computers, laptop computers, automobile computers, and smart cameras all provide additional functionality when connected to the Internet. For example, a mobile device that is presently connected to the Internet can receive and send email messages; interact with websites; obtain the full benefit of executing applications that have a backend component; download new programs, program updates, and media artifacts; access remote files; etc.

Typically, mobile devices connect to the Internet via wireless communications channels. Many mobile devices are equipped to connect to the Internet via cellular data networks operated by wireless telephony carriers. Some mobile devices are not so equipped, however, and those that are may incur significant marginal charges for sending or receiving significant volumes of data via cellular data networks.

Virtually all mobile devices are equipped to connect to the Internet via Wi-Fi networks using networking protocols specified by variants of the IEEE 802.11 standard. Because Wi-Fi networks are often free or inexpensive to use, and can in some places provide Internet connectivity where cellular data networks cannot, many mobile devices are configured to frequently scan for available Wi-Fi networks, such as at any time when the mobile device is not already actively connected to a Wi-Fi network. Performing such scanning enables the mobile device to automatically connect to already-known Wi-Fi networks, and notify its user of new Wi-Fi networks within connection range that the user can choose to connect to.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A facility for interacting with data networks using a permanent network identifier persistently stored within a computing system is described. In one example facility, in response to an opportunity to connect to a first data network, the facility identifies information for the first data network, and determines whether the determined identifying information for the first data network matches any of a set of approved data networks. In response to determining that it does, the facility establishes a connection with the first data network using the computing system's permanent network identifier, and conducts the established connection with the first data network using the computing system's permanent network identifier. In response to an opportunity to connect to a second data network, the facility determines identifying information for the second data network, and determines whether the determined identifying information for the second data network matches any of the set of approved data networks. In response to determining that it does not, the facility establishes a connection with the second data network using a temporary network identifier that is different from the computing system's permanent network identifier, and conducts the established connection with the first data network using the temporary network identifier.

DETAILED DESCRIPTION

Figure 1:
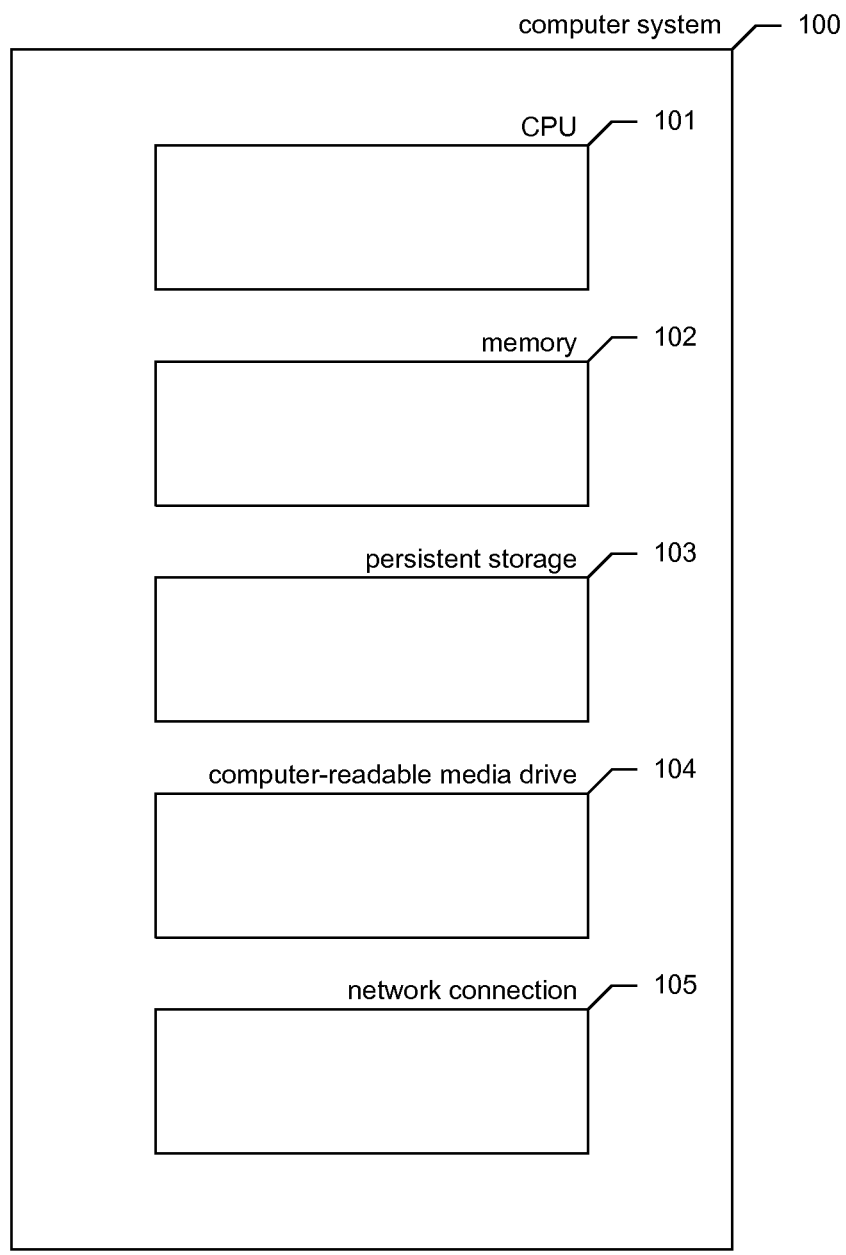
FIG. 1 is a block diagram showing some of the components that may be incorporated in at least some of the computer systems and other devices on which the facility operates.

The inventor has identified significant disadvantages with conventional approaches to the conventional mobile device networking technique of continuously scanning for available Wi-Fi networks. In particular, based upon commonly-used Wi-Fi protocols established in variants of the IEEE 802.11 standard, such scanning by mobile device involves the mobile device sending a permanent network identifier of the mobile device called a "media access control address" ("MAC address," or simply "MAC"). The inventor has recognized that, by tracking the appearance over time of scanning communications containing a particular MAC address, the operator of a Wi-Fi network in a particular location can discover the times at which a corresponding particular wireless device passes near the Wi-Fi network, thus impairing the privacy of movement of a person carrying the wireless device. The inventor has further deduced that a single entity operating multiple Wi-Fi networks or multiple separate entities operating Wi-Fi networks and sharing such tracking information can construct an even more complete picture of a person's movements.

In order to overcome these disadvantages, the inventor has conceived and reduced to practice a software and/or hardware facility for circumventing wireless device spatial tracking based on wireless device identifiers ("the facility").

In some examples, the facility does a significant portion of its scanning for Wi-Fi networks using a rotating, random substitute for its permanent MAC address, referred to herein as a "temporary MAC address" or "temporary MAC." When the wireless device is within range of a Wi-Fi network among a group of trusted Wi-Fi networks, the facility uses the device's permanent MAC address to scan for Wi-Fi networks and connect to Wi-Fi networks. In general, when the wireless device is not within range of such a trusted Wi-Fi network, the facility uses a temporary MAC address to scan for and connect to Wi-Fi networks. During times when the facility is using a temporary MAC address and is not connected to any Wi-Fi network, the facility periodically switches, or "cycles" the temporary MAC address being used to inhibit tracking even on a fine timescale.

In various examples, the facility includes Wi-Fi networks in its set of trusted Wi-Fi networks on a variety of bases, including the user explicitly designating a Wi-Fi network as trusted, a user explicitly choosing to connect to a Wi-Fi network, a user providing certain credentials as part of connecting to a Wi-Fi network, external configuration of the set of trusted Wi-Fi networks by an administrator or a certification authority, etc.

In some examples, the facility determines that the device is within range of a trusted Wi-Fi network if the name of a Wi-Fi network identified as available by scanning matches the name of a Wi-Fi network in the set of trusted Wi-Fi networks. In some examples, the facility further or instead requires that geographic positioning services on the device, such as those based upon GPS locating techniques, report that the device is within a range of geographic locations believed to be within the range of a trusted Wi-Fi network.

By behaving in some or all of the ways described above, the facility reduces the ability of operators of Wi-Fi networks to spatially track wireless devices without abrogating the benefits produced by Wi-Fi scanning. The facility also permits wireless devices to interact properly with trusted Wi-Fi networks that implement MAC filtering—that is, that only allow connections from devices using an approved native MAC address.

FIG. 1 is a block diagram showing some of the components that may be incorporated in at least some of the computer systems and other devices on which the facility operates. In various examples, these computer systems and other devices 100 can include server computer systems, desktop computer systems, laptop computer systems, tablet computer systems, netbooks, mobile phones, personal digital assistants, televisions, cameras, automobile computers, electronic media players, electronic kiosk devices, electronic table devices, electronic whiteboard devices, etc. In various examples, the computer systems and devices may include any number of the following: a central processing unit ("CPU") 101 for executing computer programs; a computer memory 102 for storing programs and data while they are being used, including the facility and associated data, an operating system including a kernel and device drivers, and one or more applications; a persistent storage device 103, such as a hard drive or flash drive for persistently storing programs and data; a computer-readable media drive 104, such as a floppy, CD-ROM, or DVD drive, for reading programs and data stored on a computer-readable medium; and/or a communications subsystem 105 for connecting the computer system to other computer systems and/or other devices to send and/or receive data, such as via the Internet or another wired or wireless network and its networking hardware, such as switches, routers, repeaters, electrical cables and optical fibers, light emitters and receivers, radio transmitters and receivers, and the like.

Figure 2:
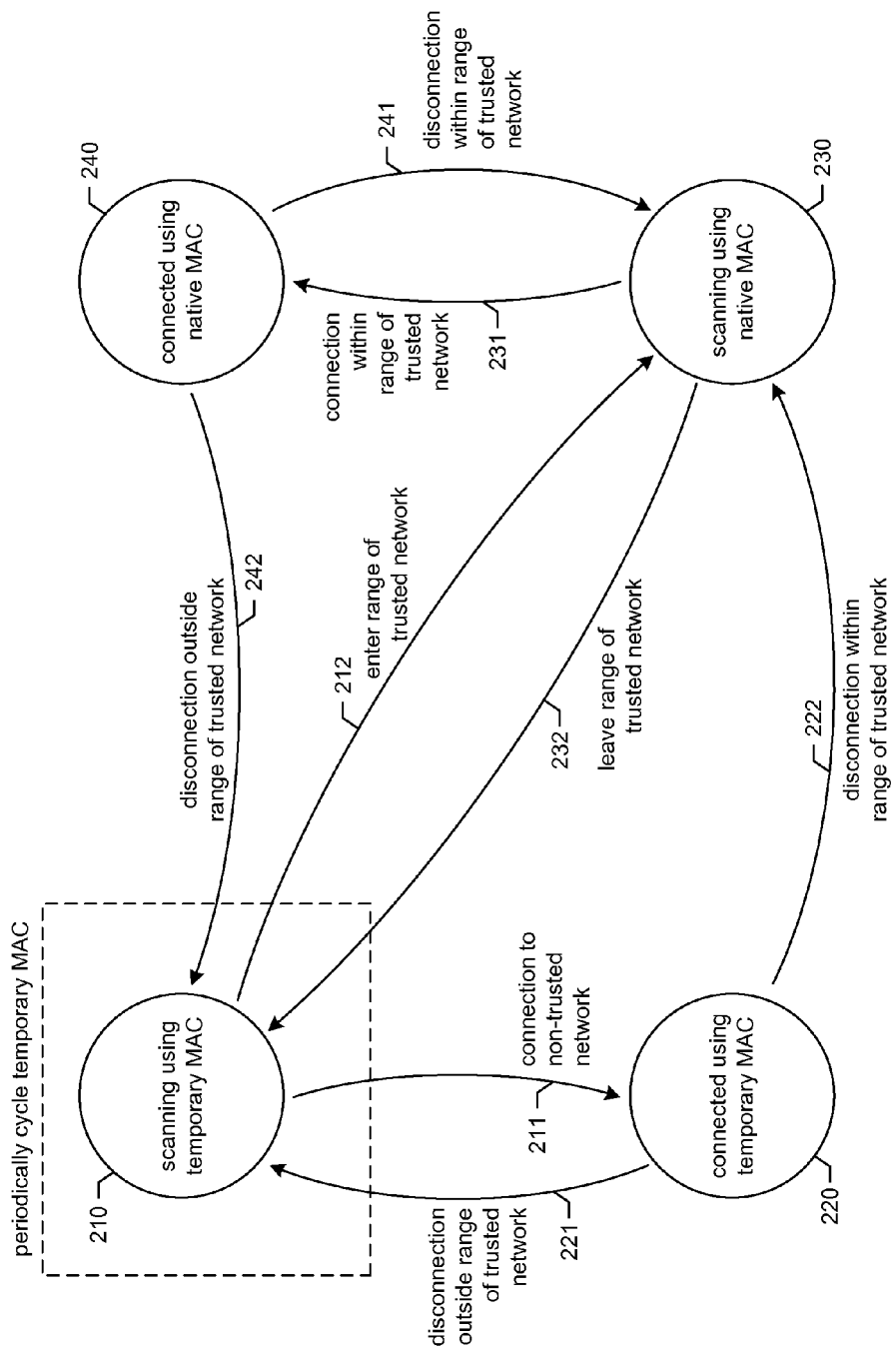
FIG. 2 is a state diagram showing how the facility transitions between states corresponding to the use of the device's native MAC versus temporary MACs in some examples.

FIG. 2 is a state diagram showing how the facility transitions between states corresponding to the use of the device's native MAC versus temporary MACs in some examples. FIG. 2 shows four states, states 210, 220, 230, and 240, that the facility transitions between. In state 210, the facility causes the device to scan for available Wi-Fi networks using a temporary MAC. In some examples, the facility begins in state 210 when it begins operating.

While the facility remains in step 210, the facility periodically cycles the temporary MAC address that the device is using to scan for Wi-Fi networks. In some examples, the facility performs this cycling at a regular or semi-regular interval, such as every one second, 5 seconds, 15 seconds, 30 seconds, 60 seconds, 90 seconds, 2 minutes, 4 minutes, 5 minutes, 10 minutes, 15 minutes, 30 minutes, etc. In some examples, in order to make it more difficult for the operators of Wi-Fi networks to connect one temporary MAC used before cycling and another temporary MAC used after cycling, the facility does one or both of (1) randomizing the length of the cycling period; and (2) imposing breaks in scanning of varying length between the scanning done with temporary MACs that are adjacent in time.

In some examples, the device and the facility use 48-bit MAC-48 MAC addresses. In some examples, the device and the facility use 48-bit EUI-48 MAC addresses. In some examples, the device and the facility use 64-bit EUI-64 MAC addresses. In generating each new temporary MAC, the facility seeks to inhibit the association of the new temporary MAC with earlier temporary MACs. In some examples, the facility randomizes the entirety of the new temporary MAC. In some examples, the facility randomizes portions of the new temporary MAC that are not likely to be a basis for how wireless networks will treat the device for networking purposes. In some examples, the facility randomizes portions of the new temporary MAC that commonly vary among wireless devices. In some examples, to generate a new temporary MAC, the facility selects a MAC that it determines is presently in use by a nearby device, and randomizes certain portions of the nearby device's MAC.

The state diagram shows two state transitions to other states from state 210: a transition 211 from state 210 to state 220 upon connection to a non-trusted network, and transition 212 from state 210 to state 230 upon entering the range of a trusted network. With respect to transition 211 from state 210 to state 220, in state 220, the facility causes the device to continue to use the temporary MAC that it was using when it connected to the non-trusted network until the facility exits this state. If this connection is disconnected at a time when the device is outside the range of any trusted network, then the facility follows transition 221 from state 220 back to state 210. While in state 220, if the connection is disconnected within range of a trusted network, then the facility transitions from state 220 to state 230.

In state 230, the device is within range of a trusted network. Accordingly, in state 230, the facility causes the device to perform Wi-Fi network scanning using its native MAC. If the device subsequently leaves the range of all trusted networks, then the facility follows transition 232 from state 230 to state 210 to revert to scanning using temporary MACs. Conversely, if the facility is in state 210 scanning using temporary MACs and enters the range of a trusted network, then the facility follows transition 212 from state 210 to state 230 to instead scan using the native MAC. While in state 230, if the device connects to a network while the device is within range of a trusted network, then the facility follows transition 231 from state 230 to state 240. In state 240, the device is connected to a network using its native MAC. If, while in state 240, disconnection from this network occurs at a time when the device is within range of a trusted network, then the facility follows transition 241 from state 240 to state 232 to cause the device to scan using the device's native MAC. If, on the other hand, disconnection occurs outside the range of any trusted network, then the facility follows transition 242 from state 240 to state 210 to cause the device to scan for networks using a temporary MAC.

Figure 3:
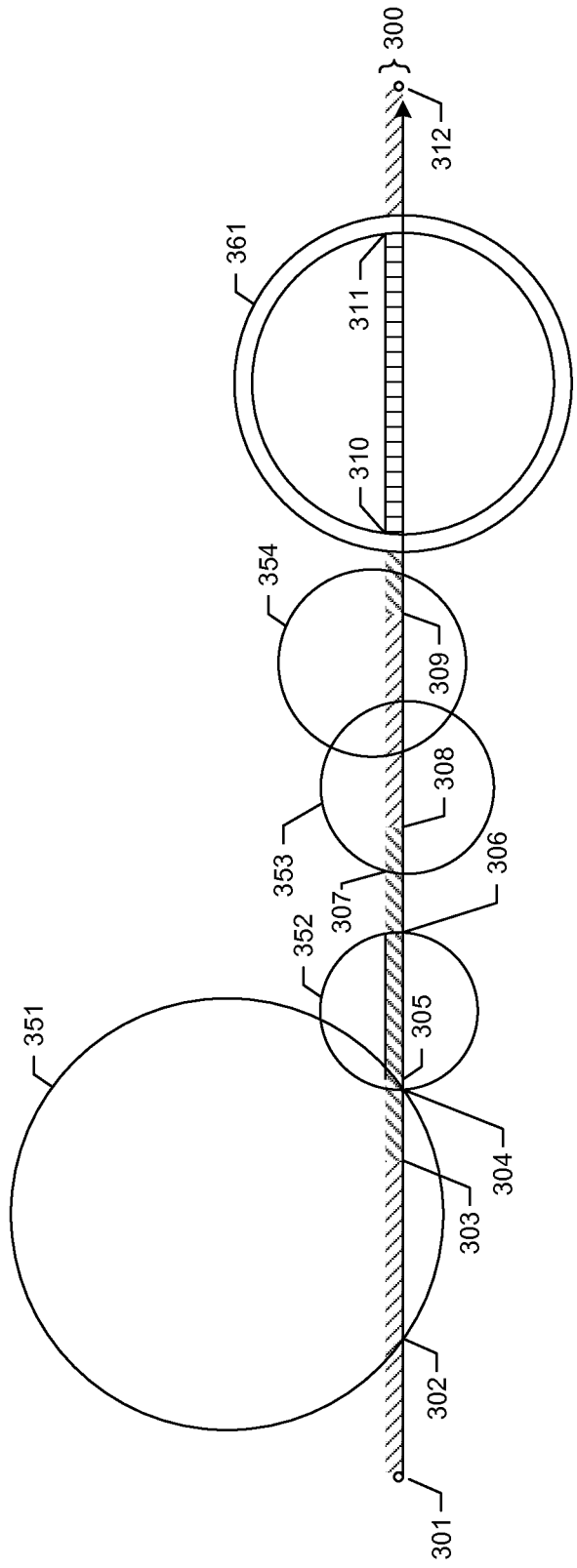
FIG. 3 is a network diagram depicting operation of the facility as a device is carried through a path.

FIG. 3 is a network diagram depicting operation of the facility as a device is carried through a path. The path 300 is from starting point 301 to ending point 312. The path traverses four untrusted networks 351-354, and one trusted network 361. The segments of the path that are chords of a network's roughly circular range are said to be "in range" of the network, either in that the network appears in scans performed throughout the segment, the facility defines the network as occupying this geographic area, or both. The hashes along path 300 indicate the version of the MAC being used by the facility at each point in the path. From point 301 to point 303, the diagonal hashes indicate that the facility uses a first temporary MAC. At point 303, a timer maintained by the facility expires, and the facility switches to using a new temporary MAC, which is shown here by hashes that extend in a different diagonal direction. Between points 305 and 306, a second horizontal line segment above the hashes shows that the device is connected to untrusted network 352, using the temporary MAC with which it was scanning when untrusted network 352 became available to the device. The horizontal line shows that this connection ends at point 306, when the device exits the range of untrusted network 352. The facility continues scanning with the temporary MAC used to connect to untrusted network 352 from point 306 until point 308, at which time the timer expires again and the facility switches to a third temporary MAC, with which it scans from point 308 to point 309. At point 309, the timer expires again, and the facility switches to using a fourth temporary MAC for network scanning. At point 310, the device comes in range of trusted network 361, the trustedness of which is indicated by a double circle. Between points 310 and 311, the vertical hashes and second horizontal line above them indicate that the facility connects to trusted network 361 using its native MAC. When the device reaches point 311 at the edge of trusted network 361's range, the facility switches from its native MAC to a new temporary MAC to resume scanning. It should be noted that the segment from point 305 to point 306 indicates that the facility connects to at least some untrusted networks using temporary MACs, thus depriving these untrusted networks of opportunities they would otherwise have had to learn the device's native MAC.

In some examples, the facility provides a computer system for interacting with wireless networks. The computer system comprises: a networking module configured to persistently store a network ID identifying the computer system; a radio configured to exchange wireless data communications with wireless networks; a network range testing subsystem configured to determine whether the computer system is in communicative range of a wireless network present on a list of approved wireless networks; and a control subsystem configured to: in response to a determination by the network range testing subsystem that the computer system is in communicative range of a wireless network present on a list of approved wireless networks, cause the radio to establish a connection with a wireless network using the network ID persistently stored by the networking module, and in response to a determination by the network range testing subsystem that the computer system is not in communicative range of a wireless network present on a list of approved wireless networks, cause the radio to establish a connection with a wireless network using a network ID different from the network ID persistently stored by the networking module.

In some examples, the facility provides a computer-readable medium having contents configured to cause a computing device to, in order to manage interactions by the computing device with wireless networks: access a list of trusted wireless networks; recurringly: determine whether the computing device is within communicative range of any of the trusted wireless networks on the accessed list; in response to determining that the computing device is within communicative range of any of the trusted wireless networks on the accessed list, perform a scan for available wireless networks using a native network address stored persistently in the computing device; and in response to determining that the computing device is not within communicative range of any of the trusted wireless networks on the accessed list, perform a scan for available wireless networks using a temporary network address different from the native network address stored persistently in the computing device.

In some examples, the facility provides a method in a computing system for interacting with data networks, the computing system having a permanent network identifier persistently stored within the computing system. The method comprises: in response to an opportunity to connect to a first data network: determining identifying information for the first data network; determining whether the determined identifying information for the first data network matches any of a set of approved data networks; in response to determining that the determined identifying information for the first data network matches one of the set of approved data networks: establishing a connection with the first data network using the computing system's permanent network identifier; conducting the established connection with the first data network using the computing system's permanent network identifier; in response to an opportunity to connect to a second data network: determining identifying information for the second data network; determining whether the determined identifying information for the second data network matches any of the set of approved data networks; in response to determining that the determined identifying information for the second data network matches none of the set of approved data networks: establishing a connection with the second data network using a temporary network identifier that is different from the computing system's permanent network identifier; and conducting the established connection with the first data network using the temporary network identifier.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

I claim:

1. A computer system for interacting with wireless networks, comprising:
a networking module configured to persistently store a network ID identifying the computer system;
a radio configured to exchange wireless data communications with wireless networks;
a network range testing subsystem configured to determine whether the computer system is in communicative range of any wireless network present on a list of approved wireless networks by performing network scanning using a temporary network ID different from the network ID persistently stored by the networking module; and
a control subsystem configured to:
in response to a determination by the network range testing subsystem that the computer system is in communicative range of any wireless network present on a list of approved wireless networks, cause the radio to establish a connection with a wireless network using the network ID persistently stored by the networking module,
in response to a determination by the network range testing subsystem that the computer system is not in communicative range of any wireless network present on a list of approved wireless networks, cause the radio to establish a connection with a wireless network using the temporary network ID;
cycle the temporary network ID to a new value each time a cycling period having a varying random length expires; and impose breaks of varying length in the network scanning.

2. The computer system of claim 1 wherein the networking module is a network interface card.

3. The computer system of claim 1 wherein the network IDs are each a media access control address.

4. The computing system of claim 3 wherein the media access control address corresponding with the network ID different from the network ID persistently stored by the networking module is based on a media access control address of a nearby device.

5. The computer system of claim 1 wherein the control subsystem is further configured to, in response to a determination by the network range testing subsystem that the computer system is in communicative range of any wireless network present on a list of approved wireless networks, cause the radio to scan for available wireless networks using the network ID persistently stored by the networking module.

6. The computer system of claim 1 wherein the control subsystem is further configured to, in response to a determination by the network range testing subsystem that the computer system is not in communicative range of any wireless network present on a list of approved wireless networks, cause the radio to scan for available wireless networks using any network ID different from the network ID persistently stored by the networking module.

7. The computer system of claim 1 wherein the control subsystem is further configured to, in response to a determination by the network range testing subsystem that the computer system is in communicative range of any wireless network present on a list of approved wireless networks, cause the radio to scan for available networks using the network ID persistently stored by the networking module upon disconnection with a wireless network.

8. A computer-readable storage medium, the computer-readable storage medium being neither a signal per se nor a carrier wave, the computer-readable storage medium having contents configured to cause a computing device to, in order to manage interactions by the computing device with wireless networks;
  access a list of trusted wireless networks;
  recurringly:
    determine whether the computing device is within communicative range of any of the trusted wireless networks on the accessed list;
    in response to determining that the computing device is within communicative range of any of the trusted wireless networks on the accessed list, perform a scan for available wireless networks using a native network address stored persistently in the computing device; and
    in response to determining that the computing device is not within communicative range of any of the trusted wireless networks on the accessed list, perform a scan for available wireless networks using a temporary network address different from the native network address stored persistently in the computing device; and
  recurringly change the temporary network address used to scan for available wireless networks at intervals of predetermined, randomized lengths.

9. The computer-readable storage medium of claim 8 wherein the computer-readable storage medium has contents that further cause the computing device to:
  receive user input specifying that a selected wireless network is to be added to the accessed list of trusted wireless networks; and
  in response to receiving the user input, add the selected wireless network to the accessed list of trusted wireless networks.

10. The computer-readable storage medium of claim 8 wherein the computer-readable storage medium has contents that further cause the computing device to:
  receive user input specifying that a selected wireless network is to be removed from the accessed list of trusted wireless networks; and
  in response to receiving the user input, remove the selected wireless network from the accessed list of trusted wireless networks.

11. The computer-readable storage medium of claim 8 wherein the computer-readable storage medium has contents that further cause the computing device to:
  in response to determining that the computing device is not within communicative range of any of the trusted wireless networks on the accessed list, connect to an available wireless network not on the accessed list using a temporary network address different from the native network address stored persistently in the computing device.

12. The computer-readable storage medium of claim 8 wherein the computer-readable storage medium has contents that further cause the computing device to:
  in response to determining that the computing device is within communicative range of any of the trusted wireless networks on the accessed list, connect to an available wireless network not on the accessed list using the native network address stored persistently in the computing device.

13. The computer-readable storage medium of claim 8 wherein the computer-readable storage medium has contents that further cause the computing device to:
  in response to determining that the computing device is within communicative range of any of the trusted wireless networks on the accessed list, connect to an available wireless network on the accessed list using the native network address stored persistently in the computing device.

14. A method in a computing system for interacting with data networks, the computing system having a permanent network identifier persistently stored within the computing system, the method comprising:
  in response to an opportunity to connect to a first data network:
    determining identifying information for the first data network;
    determining whether the determined identifying information for the first data network matches any of a set of approved data networks;
    in response to determining that the determined identifying information for the first data network matches one of the set of approved data networks:
      establishing a connection with the first data network using the computing system's permanent network identifier;
      conducting the established connection with the first data network using the computing system's permanent network identifier;
  in response to an opportunity to connect to a second data network:
    determining identifying information for the second data network;
    determining whether the determined identifying information for the second data network matches any of the set of approved data networks;

in response to determining that the determined identifying information for the second data network matches none of the set of approved data networks:
  establishing a connection with the second data network using a temporary network identifier that is different from the computing system's permanent network identifier; and
  conducting the established connection with the second data network using the temporary network identifier;
cycling the temporary network identifier to a new value each time a cycling period having a varying random length expires;
scanning for opportunities to connect to data networks using the temporary network identifier; and
imposing breaks of varying length in the network scanning.

15. The method of claim 14 wherein the permanent network identifier and temporary network identifier are both MAC addresses.

16. The method of claim 15 wherein the temporary network identifier MAC address is based on a MAC address of a nearby device.

17. The method of claim 14 wherein the first and second data networks are wireless networks.

18. The method of claim 17 wherein the first and second data networks are Wi-Fi networks.

* * * * *